United States Patent
Sandhu et al.

(10) Patent No.: US 8,406,120 B1
(45) Date of Patent: Mar. 26, 2013

(54) REMEDIAL MEASURES FOR WIRELESS COMMUNICATION DEVICE ACCESS REQUEST FAILURE

(75) Inventors: Sandip Sandhu, San Diego, CA (US); Derek Yachanin, San Diego, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 502 days.

(21) Appl. No.: 12/699,181

(22) Filed: Feb. 3, 2010

(51) Int. Cl.
*H04W 4/00* (2009.01)
(52) U.S. Cl. .......................................... 370/216; 714/23
(58) Field of Classification Search .................. None
See application file for complete search history.

(56) References Cited

U.S. PATENT DOCUMENTS

| | | | | |
|---|---|---|---|---|
| 5,440,758 | A * | 8/1995 | Grube et al. ...................... | 455/9 |
| 6,314,532 | B1 * | 11/2001 | Daudelin et al. ........... | 714/38.14 |
| 6,754,501 | B1 | 6/2004 | McRae et al. | |
| 8,135,985 | B2 * | 3/2012 | Mishra et al. ................... | 714/13 |
| 2003/0217310 | A1 * | 11/2003 | Ebsen et al. ..................... | 714/42 |
| 2004/0038700 | A1 * | 2/2004 | Gibbs ........................... | 455/522 |
| 2005/0063331 | A1 * | 3/2005 | Kim et al. ...................... | 370/328 |
| 2005/0186952 | A1 * | 8/2005 | Kitajima ....................... | 455/419 |
| 2005/0193111 | A1 | 9/2005 | Roy | |
| 2006/0280150 | A1 * | 12/2006 | Jha et al. ....................... | 370/338 |
| 2007/0032255 | A1 * | 2/2007 | Koo et al. ..................... | 455/512 |
| 2007/0201377 | A1 | 8/2007 | Santhanam | |
| 2009/0180376 | A1 * | 7/2009 | Gibbs ........................... | 370/216 |
| 2009/0217078 | A1 * | 8/2009 | Cassett et al. ..................... | 714/2 |
| 2011/0096671 | A1 * | 4/2011 | Lindstrom et al. ............ | 370/242 |
| 2012/0230214 | A1 * | 9/2012 | Kozisek et al. ............... | 370/252 |

* cited by examiner

*Primary Examiner* — Min Jung

(57) ABSTRACT

Embodiments disclosed herein provide systems and methods that allow a wireless device to reinitialize operating software of the wireless device due to a quantity of failed communication network access requests. In a particular embodiment, a wireless device transfers a plurality of access requests to a communication network during a period of time. The wireless device monitors responses to the plurality of access requests to determine a quantity of failed access requests during the period of time. Then, the wireless device determines whether the quantity of failed access requests is greater than a threshold value. If the quantity of failed access requests is greater than the threshold value, then wireless device reinitializes the operating software of the wireless device.

20 Claims, 5 Drawing Sheets

REMEDIAL MEASURES FOR WIRELESS COMMUNICATION DEVICE ACCESS REQUEST FAILURE

TECHNICAL BACKGROUND

Wireless communication devices, such as cellular phones, exchange communications with communication network wireless access nodes over communication access channels. Each wireless access node has a finite number of access channels for connecting wireless devices. A wireless device that connects to a wireless access node must request one of these access channels before the wireless device can exchange communications with the communication network.

The access requests can either be granted or they can fail. The access requests can fail for various reasons. For example, the communication network may not receive the access request, the wireless device may not receive the access request response from the communication network, or the communication network may deny the access request. Any of these failures may occur due to operational problems with the wireless device.

OVERVIEW

Embodiments disclosed herein provide systems and methods that allow a wireless device to reinitialize operating software of the wireless device due to a quantity of failed communication network access requests. In a particular embodiment, a wireless device transfers a plurality of access requests to a communication network during a period of time. The wireless device monitors responses to the plurality of access requests to determine a quantity of failed access requests during the period of time. The wireless device further determines whether the quantity of failed access requests is greater than a threshold value. If the quantity of failed access requests is greater than the threshold value, then wireless device reinitializes the operating software of the wireless device.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

A wireless device transfers an access request to a communication network in order to be allocated an access channel necessary to exchange user communications. The access request may fail because the communication network denies the use of an access channel. Alternatively, the communication network may not receive the access channel request or the wireless device may not receive the response from the communication network. The above failures of the wireless device to obtain an access channel may be due, in part, to issues with the operating software of the wireless device. Reinitializing the operating software may solve any issues with the operating software that may be causing the failed access requests.

Figure 1:
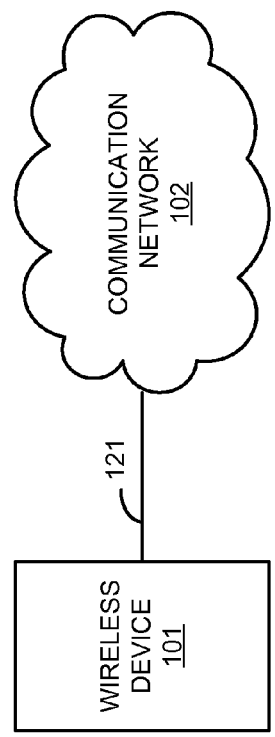
FIG. 1 illustrates a wireless communication system.

FIG. 1 illustrates wireless communication system 100. Wireless communication system 100 includes wireless communication device 101 and communication network 102. Wireless communication device 101 and communication network 102 communicate over wireless link 121.

Figure 2:
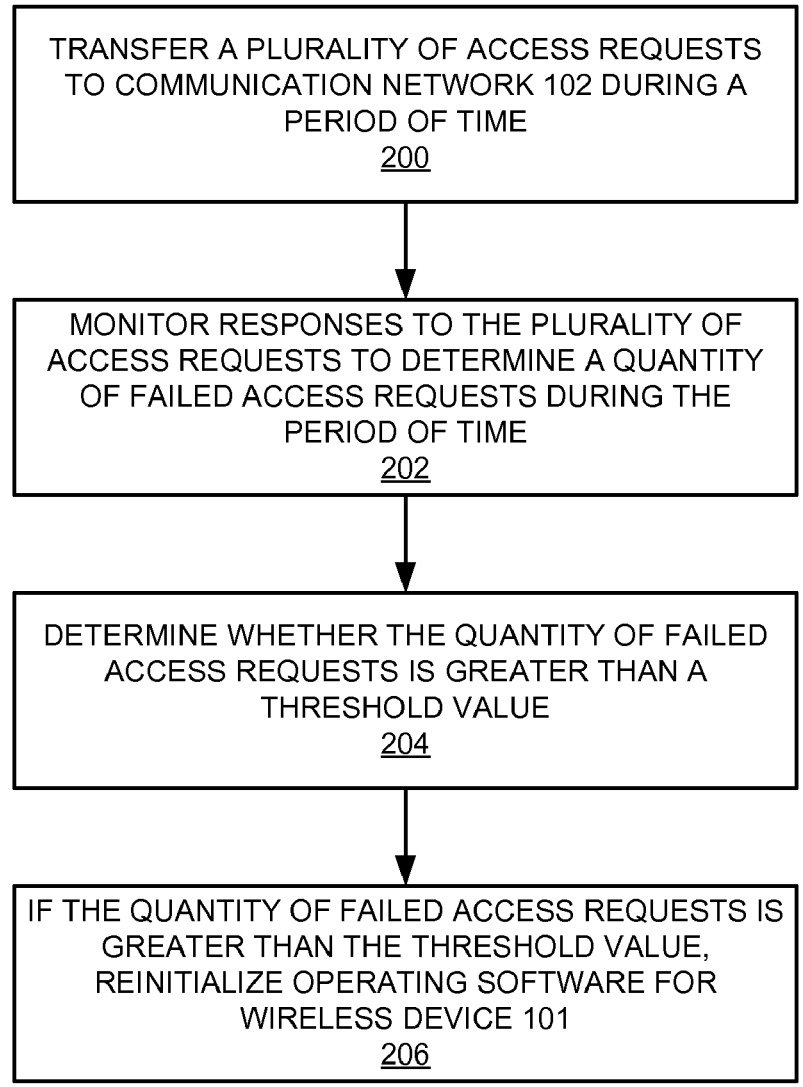
FIG. 2 illustrates the operation of a wireless communication system.

FIG. 2 illustrates the operation of wireless communication system 100. Wireless device 101 transfers a plurality of access requests to communication network 102 (step 200). Each of the access requests may be sent on a control channel to an access node located within communication network 102. The access requests request access to a wireless communication channel necessary for wireless device 101 to exchange user communications with communication network 102 over link 121.

Wireless device 101 monitors responses to the plurality of access requests to determine a quantity of failed access requests during the period of time (step 202). The access requests may be considered failed access requests because wireless device 101 received no response after an access request or communication system 102 may have otherwise sent a response that did not grant communication channel access to wireless device 101.

Wireless device 101 determines whether the quantity of failed access requests is greater than a threshold value (step 204). If the quantity of failed access requests is greater than the threshold value, wireless device 101 reinitializes operating software for wireless device 101 (step 206). In other words, if the frequency of failed access requests by wireless device 101 is above a threshold, then wireless device 101 will reinitialize the operating software for wireless device 101 in an attempt to remedy the failed access requests. Reinitializing software is also commonly referred to as rebooting, reloading, or restarting software.

Referring back to FIG. 1, wireless communication device 101 comprises Radio Frequency (RF) communication circuitry and an antenna. The RF communication circuitry typically includes an amplifier, filter, modulator, and signal processing circuitry. Wireless device 101 may also include a user interface, memory device, software, processing circuitry, or some other communication components. Wireless device 101 may be a telephone, computer, e-book, mobile Internet appliance, wireless network interface card, media player, game console, or some other wireless communication apparatus—including combinations thereof.

Communication network 102 comprises telephony switches, wireless access nodes, Internet routers, network gateways, computer systems, communication links, or some other type of communication equipment—including combinations thereof.

Wireless link 121 uses the air or space as the transport media. Wireless link 121 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format.

Wireless link 121 may connect wireless device 101 with communication network 102 through various intermediate systems. In particular, wireless link 121 may connect wireless device 101 to communication network 102 via a wireless access node. The wireless access node comprises RF communication circuitry and an antenna. The RF communication circuitry typically includes an amplifier, filter, RF modulator, and signal processing circuitry. The wireless access node may also comprise a router, server, memory device, software, processing circuitry, cabling, power supply, network communication interface, structural support, or some other communication apparatus. The wireless access node could be a base station, Internet access node, telephony service node, wireless data access point, or some other wireless communication system—including combinations thereof.

Furthermore, the access requests transferred from wireless device 101 may be processed in a communication control system to determine whether wireless device 101 should be granted a wireless communication channel. The communication control system comprises a computer system and communication interface. The communication control system may also include other components such as a router, server, data storage system, and power supply. The communication control system may reside in a single device or may be distributed across multiple devices. The communication control system could be external to the wireless access node or could be integrated within the components of the wireless access node. The communication control system could be a mobile switching center, network gateway system, Internet access node, application server, service node, or some other communication system—including combinations thereof.

Figure 3:
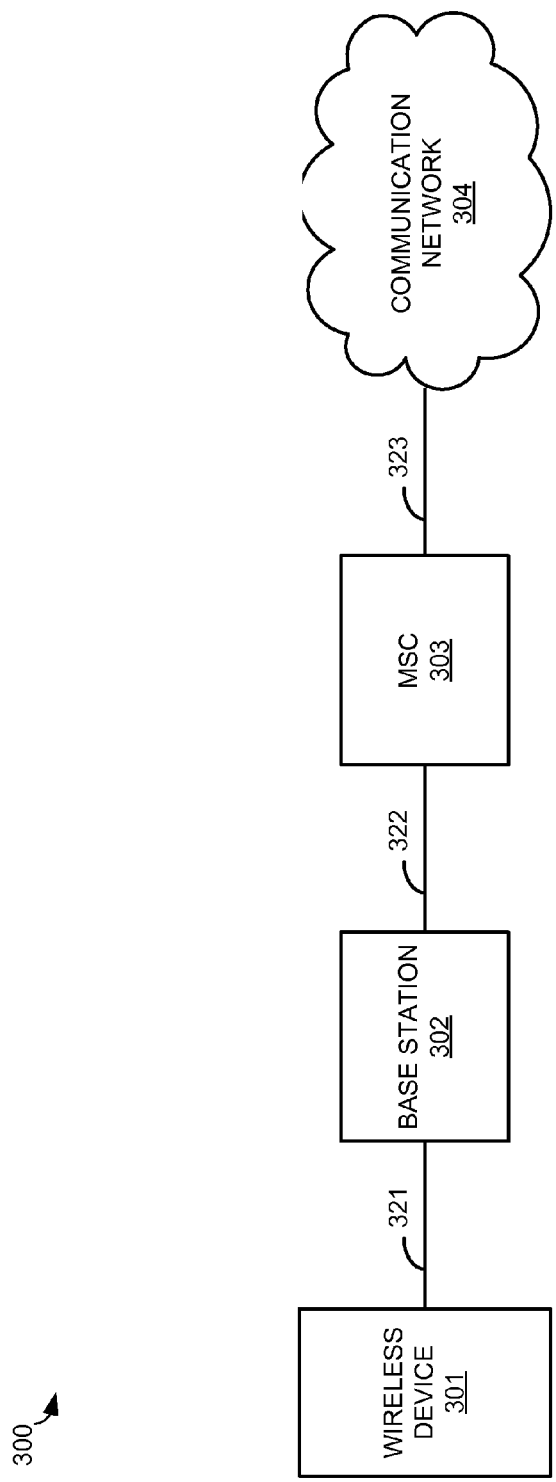
FIG. 3 illustrates a wireless communication system.

FIG. 3 illustrates wireless communication system 300. Wireless communication system 300 includes wireless device 301, base station 302, mobile switching center (MSC) 303, and communication network 304. Wireless device 301 and base station 302 communicate over wireless link 321. Base station 302 and MSC 303 communicate over communication link 322. MSC 303 and communication network 304 communicate over link 323.

In operation, wireless device 301 transfers a plurality of access requests to base station 302 during a period of time. If the access requests are received at base station 302, then a control system within base station 302 may determine whether wireless device 301 is granted an access channel. Alternatively, MSC 303 may process the access request from wireless device 301 to determine whether wireless device 301 is granted an access channel. MSC 303 may deny access because the owner of wireless device 301 has not paid his or her wireless service bill or for some other network administrative issue. In response to the access request from wireless device 301, base station 302 or MSC 303 will transfer a response message indicating whether wireless device 301 is allowed an access channel.

Wireless device 301 monitors the access request response messages to determine a quantity of the access requests were unsuccessful or failed. An access request may fail because the response message indicates that wireless device 301 is denied network access. The access request may be denied because there are no available access channels, there is a problem with communication network 304, including base station 302 and MSC 303, the access request indicates some sort of malfunction with wireless device 301, or for some other reason that base station 302, MSC 303, or communication network determines wireless device 301 should be denied an access channel. Alternatively, an access request may fail because the access request is never received by base station 302, the response message is never received by wireless device 301, or some other issue within wireless device 301, base station 302, MSC 303, or communication network 304 causes the failure of the access request transfer or the response message transfer.

Wireless device 301 then determines whether the quantity of failed access requests during the period of time is greater than a threshold value. If the quantity is greater than the threshold value, then wireless device 301 reinitializes the operating software for wireless device 301. For example, the threshold value may be set at a frequency of ten access request failures per every sixty-second period of time. If wireless device 301 determines that the quantity of failed access requests is greater than ten failed access requests in the sixty-second period of time, then wireless device 301 reinitializes the operating software for wireless device 301 in an attempt to remedy the failed access requests. If wireless device 301 determines that the quantity of failed access requests is less than or equal to ten, then wireless device 301 does not reinitialize the operating software.

After software is reinitialized, mobile device 301 transfers another one or more access requests to base station 302. Additionally, the above process may repeat for an indefinite length of time.

In some embodiments, wireless device 301 determines a quantity of failed access requests that occur consecutively during the period of time and the threshold value refers to a number of consecutive failed access requests during the period of time. Therefore, in the above example, the failed access requests must have occurred consecutively in order to be greater than the threshold value.

In some embodiments, wireless device 301 monitors the number of times that the operating software is reinitialized due to the quantity of access failures being above a threshold value. Wireless device 301 determines whether the number of times that the operating software reinitializes is greater than a threshold value. If the number of times that the operating software reinitializes is greater than the threshold value, then wireless device 301 does not reinitialize the operating software.

In some embodiments, as an alternative, or in addition, to reinitializing the operating software, wireless device 301 may determine whether the quantity of failed access requests is greater than a second threshold value. The second threshold value may be lower than the threshold value for reinitializing the operating software. If the quantity of failed access requests is greater than the second threshold value, then wireless device 301 stops transferring access requests for a second period of time. Wireless device 301 then transfers a second plurality of access requests to base station 302 during a third period of time. Wireless device 301 monitors the responses to the second plurality of access requests to determine a second quantity of failed access requests during the third period of time. Then wireless device 301 determines whether the quantity of failed access requests is greater than a third threshold value. If the second quantity of access requests is greater than the third threshold value, wireless device 301 stops transference of access requests for a fourth period of time.

Therefore, there may exist multiple threshold values that either cause wireless device 301 to reinitialize the operating software of wireless device 301, or cause wireless device 301 to stop transferring access requests for various periods of time, in an attempt to remedy the failed access requests.

Figure 4:
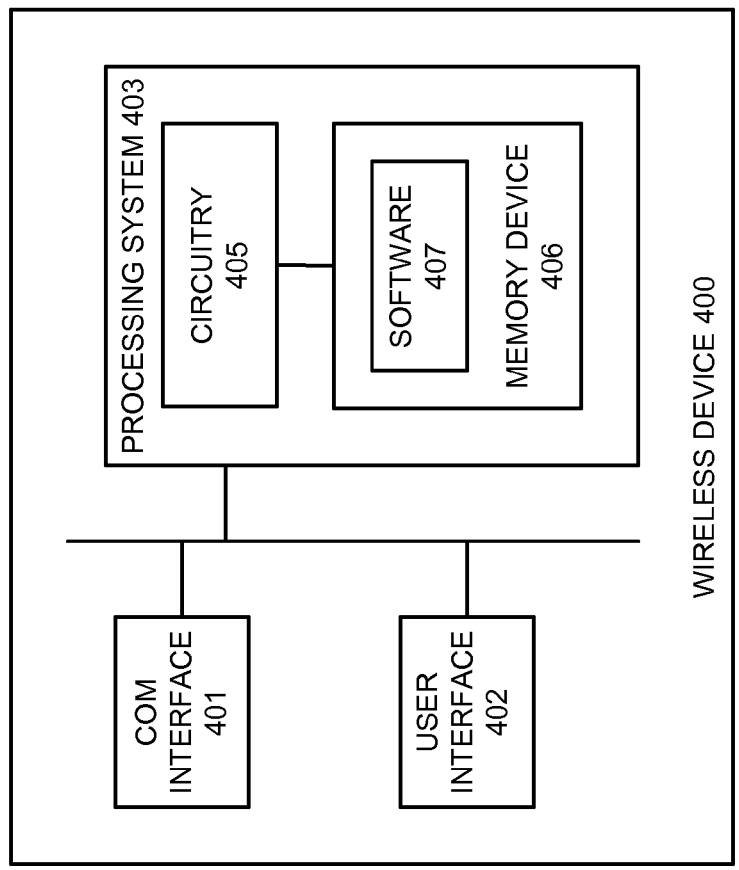
FIG. 4 illustrates a wireless communication device.

FIG. 4 illustrates wireless communication device 400. Wireless communication device 400 is an example of wireless communication device 101, although device 101 could use alternative configurations. Wireless communication device 400 comprises wireless communication interface 401, user interface 402, and processing system 403. Processing system 403 is linked to wireless communication interface 401 and user interface 402. Processing system 403 includes processing circuitry 405 and memory device 406 that stores operating software 407. Wireless communication device 401 may include other well-known components such as a battery and enclosure that are not shown for clarity. Wireless communication device 401 may be a telephone, computer, e-book, mobile Internet appliance, media player, game console, wireless network interface card, or some other wireless communication apparatus—including combinations thereof.

Wireless communication interface 401 comprises RF communication circuitry and an antenna. The RF communication circuitry typically includes an amplifier, filter, RF modulator, and signal processing circuitry. Wireless communication interface 401 may also include a memory device, software, processing circuitry, or some other communication device. Wireless communication interface 401 may use various protocols, such as CDMA, EVDO, WIMAX, GSM, LTE, WIFI, HSPA, or some other wireless communication format. Wireless communication interface transfers a plurality of access requests to a communication network during an initial period of time and receives response messages, if any, from the communication network.

User interface 402 comprises components that interact with a user to receive user inputs and to present media and/or information. User interface 402 may include a speaker, microphone, buttons, lights, display screen, touch screen, touch pad, scroll wheel, communication port, or some other user input/output apparatus—including combinations thereof. User interface 402 may omitted in some examples.

Processing circuitry 405 comprises microprocessor and other circuitry that retrieves and executes operating software 407 from memory device 406. Memory device 406 comprises a disk drive, flash drive, data storage circuitry, or some other memory apparatus. Processing circuitry 405 is typically mounted on a circuit board that may also hold memory device 406 and portions of communication interface 401 and user interface 402. Operating software 407 comprises computer programs, firmware, or some other form of machine-readable processing instructions. Operating software 407 may include an operating system, utilities, drivers, network interfaces, applications, or some other type of software. When executed by processing circuitry 405, operating software 407 directs processing system 403 to operate wireless communication device 400 as described herein.

In particular, operating software 407 directs processing system 403 to transfer a plurality of access requests to a communication network during a period of time using communication interface 401. Processing system 403 is further directed to monitor responses to the plurality of access requests received using communication interface 401 to determine a quantity of failed access requests during the period of time. Processing system 403 can then determine whether the quantity of failed access requests is greater than a threshold value. If the quantity of failed access requests is greater than the threshold value, processing system 403 is directed to reinitialize, or reboot, operating software 407 in processing system 403.

It should be understood that operating software 407 may be called firmware on some types of wireless devices. Additionally, only a subset of operating software 407 may be reinitialized in processing system 403, rather than reinitializing the entirety of operating software 407 for wireless device 400. The subset of operating software 407 that is reinitialized may be the subset responsible for transferring access requests.

Figure 5:
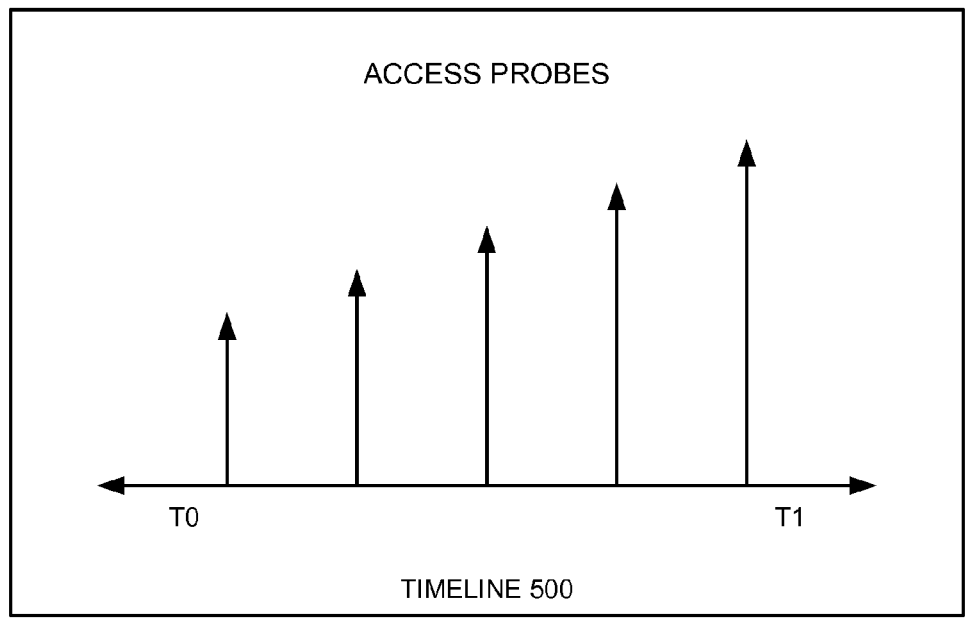
FIG. 5 illustrates wireless access request timelines.
Figure 5:
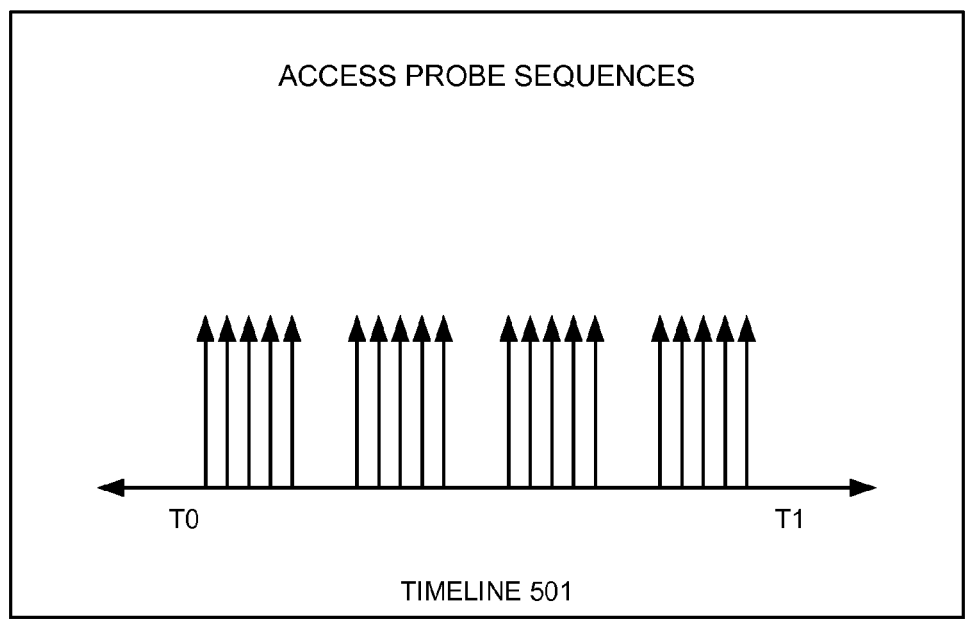

FIG. 5 illustrates graphical timelines 500 and 501 showing example access requests that a wireless device will transfer to request an access channel on a communication network. Timelines 500 and 501 show access requests that occur during the period of time between time 0 (T0) and time 1 (T1). An individual access request may be an access probe, such as the access probe used in the operation of a code division multiple access wireless network. Timeline 500 shows access requests being access probes. Alternatively, an individual access request may be a sequence of the previously mentioned access probes. Timeline 501 shows access requests being a sequence of access probes. Timelines 500 and 501 are merely examples and the number of access requests that a wireless device may send during a period of time may be different than what is displayed.

The operation of a wireless device in accordance with timeline 500, begins with the wireless device transferring 5 access probes to a communication network during the period of time T0-T1. The height of the access probes increases after each failed access attempt to represent that the power level may increase for each subsequent access probe following a failed access probe. However, the power level does not need to increase after each failed probe.

The wireless device monitors responses to the access probes to determine a quantity of failed access probes during the period of time T0-T1. The wireless device then determines whether the quantity of failed access probes is greater than a threshold value. If the quantity of failed access requests is greater than the threshold value, the wireless device reinitializes the operating software for the wireless device. For example, if the threshold is set at 3 and the wireless device has four out of the five access probes fail during time period T0-T1, then the wireless device will reinitialize the operating software for the wireless device.

The operation of a wireless device in accordance with timeline 501, begins with the wireless device transferring 4 access requests with each access request comprising 5 access probes to a communication network during the period of time T0-T1. Unlike timeline 500, the power level of the access probes does not increase after each failed access attempt. However, the power level may increase after failed access request on an individual access probe basis or for the access request as a whole.

The wireless device monitors responses to the access requests to determine a quantity of failed access requests during the period of time T0-T1. The wireless device then determines whether the quantity of failed access requests is greater than a threshold value. An access request may be considered failed if one or more access probes within the access request fails. If the quantity of failed access requests is greater than the threshold value, the wireless device reinitializes the operating software for the wireless device. For example, if the threshold is set at 3 and the wireless device has four out of the five access requests fail during time period T0-T1, then the wireless device will reinitialize the operating software for the wireless device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless device comprising:
   transferring a plurality of access requests to a communication network during a period of time;
   monitoring responses to the plurality of access requests to determine a quantity of failed access requests during the period of time;
   determining whether the quantity of failed access requests is greater than a threshold value; and
   if the quantity of failed access requests is greater than the threshold value, reinitializing operating software of the wireless device.

2. The method of claim 1 wherein the quantity of failed access requests occur consecutively within the plurality of access requests.

3. The method of claim 1 wherein each access request of the plurality of access requests comprises a network access probe.

4. The method of claim 1 wherein each access request comprises a sequence of network access probes.

5. The method of claim 4 wherein each consecutive network access probe of the sequence of access probes is transmitted at a higher power level than the previous network access probe.

6. The method of claim 1 wherein at least one of the failed access requests comprises a network access refusal.

7. The method of claim 1 wherein at least one of the failed access requests comprises an network access probe transfer failure.

8. The method of claim 1 further comprising:
   determining whether the quantity of failed access requests is greater than a second threshold value; and
   if the quantity of failed access requests is greater than the second threshold value, stopping transference of access requests for a second period of time.

9. The method of claim 8 further comprising:
   after the second period of time, transferring a second plurality of access requests to the communication network during a third period of time;
   monitoring response to the second plurality of access requests to determine a second quantity of failed access requests during the third period of time;
   determining whether the quantity of failed access requests is greater than a third threshold value;
   if the second quantity of failed access requests is greater than the third threshold value, stopping transference of access requests for a fourth period of time.

10. The method of claim 1 wherein the communication network comprises a code division multiple access network.

11. A wireless device comprising:
    a communication interface configured to transfer a plurality of access requests to a communication network during a period of time and receive responses to the plurality of access requests;
    a processing system configured to run operating software, monitor the responses to the plurality of access requests to determine a quantity of failed access requests during the period of time, determine whether the quantity of failed access requests is greater than a threshold value, and, if the quantity of failed access requests is greater than the threshold value, reinitialize the operating software.

12. The wireless device of claim 11 wherein the quantity of failed access requests occur consecutively within the plurality of access requests.

13. The wireless device of claim 11 wherein each access request of the plurality of access requests comprises a network access probe.

14. The wireless device of claim 11 wherein each access request comprises a sequence of network access probes.

15. The wireless device of claim 14 wherein each consecutive network access probe of the sequence of network access probes is transmitted at a higher power level than the previous network access probe.

16. The wireless device of claim 11 wherein at least one of the failed network access requests comprises a network access refusal.

17. The wireless device of claim 11 wherein at least one of the failed network access requests comprises a network access probe transfer failure.

18. The wireless device of claim 11 wherein the processing system is further configured to determine whether the quantity of failed access requests is greater than a second threshold value and, if the quantity of failed access requests is greater than the second threshold value, stopping transference of access requests for a second period of time.

19. The wireless device of claim 18 further comprising:
    the communication interface further configured to, after the second period of time, transfer a second plurality of access requests to the communication network during a third period of time;
    the processing system further configured to monitor responses to the second plurality of access requests to determine a quantity of failed access requests during the period of time, determine whether the second quantity of failed access requests is greater than a third threshold value, and, if the quantity of failed access requests is greater than the third threshold value, stopping the transference of access requests for a fourth period of time.

20. The wireless device of claim 11 wherein the communication network is a code division multiple access network.

* * * * *